(12) United States Patent
Lussier

(10) Patent No.: US 11,746,928 B2
(45) Date of Patent: Sep. 5, 2023

(54) VACUUM HOSE HOLDING APPARATUS

(71) Applicant: Charles Victor Lussier, Grande Prairie (CA)

(72) Inventor: Charles Victor Lussier, Grande Prairie (CA)

(*) Notice: Subject to any disclaimer, the term of this patent is extended or adjusted under 35 U.S.C. 154(b) by 0 days.

(21) Appl. No.: 17/645,331

(22) Filed: Dec. 21, 2021

(65) Prior Publication Data

US 2023/0194021 A1 Jun. 22, 2023

(51) Int. Cl.
*F16L 3/10* (2006.01)
*F16L 3/00* (2006.01)
*A47L 9/24* (2006.01)

(52) U.S. Cl.
CPC ............ *F16L 3/1058* (2013.01); *A47L 9/248* (2013.01); *F16L 3/003* (2013.01)

(58) Field of Classification Search
CPC .... B65D 90/24; F16L 3/01; F16L 3/16; F16L 3/1058; F16L 3/003; A47L 9/248
USPC ............. 248/75, 77, 78, 79, 80, 81; 138/106
See application file for complete search history.

(56) References Cited

U.S. PATENT DOCUMENTS

| 2,189,364 | A | * | 2/1940 | Kirsten | ................... | A01G 25/00 248/79 |
| 3,603,539 | A | * | 9/1971 | Clegg, Jr. | .............. | A62C 33/04 248/229.13 |
| 8,740,157 | B2 | * | 6/2014 | Jatzke | .................... | F16B 21/084 248/65 |
| 8,839,549 | B2 | * | 9/2014 | Baker, III | ................. | F16L 3/14 43/21.2 |
| 2014/0001316 | A1 | * | 1/2014 | Shelton | .................. | A01G 25/09 248/75 |

* cited by examiner

*Primary Examiner* — Muhammad Ijaz
(74) *Attorney, Agent, or Firm* — Orin Del Vecchio

(57) ABSTRACT

A vacuum hose holding apparatus that is configured to be releasably secured to a container proximate an upper edge thereof wherein the present invention is operable to have a vacuum hose releasably secured thereto and maintain position thereof during discharge of debris into the container. The present invention includes a frame wherein the frame includes a central cradle member. The central cradle member is secured to the container with a first securing member and a second securing member. A first hose support section extends downward from the central cradle member and includes a hose retention member operably coupled thereto. A second hose support section is secured to the upper end of the central cradle member and extends outward therefrom. The second hose support section includes a hose engagement member that is arcuate in shape. The central cradle member further includes a hose retention member.

8 Claims, 4 Drawing Sheets

VACUUM HOSE HOLDING APPARATUS

FIELD OF THE INVENTION

The present invention relates generally to vacuum truck elements, more specifically but not by way of limitation, a vacuum truck hose holding apparatus that is operable to hold a vacuum hose operably coupled to a vacuum truck wherein the apparatus is releasably secured to the container in which the vacuum truck is depositing material via the vacuum hose.

BACKGROUND

As is known in the art, vacuum trucks, also known as vacuum tankers, are utilized by municipalities and various industries to collect and transport large scale liquid, debris and sludge. Vacuum trucks are commonly utilized in the sewer and septic industry but are also employed in various industrial applications where large scale clean up of liquid, sludge and debris is required. By way of example but not limitation, vacuum trucks are utilized to remove debris created by hydro-excavation or drilling jobs. These applications create a significant amount of debris that contains both liquid and solid matter and the material is removed and deposited in an alternate location.

Subsequent collection of the desired debris the vacuum truck will transport the debris to a desired location for discharge of the debris. Many times the debris is deposited into a container, which are typically large open steel containers to which the vacuum truck will park adjacent thereto. Conventionally, during deposit of collected debris the process requires two individuals wherein one operator will engage the operational controls on the vacuum truck and another individual will be responsible for holding the vacuum hose adjacent the end to ensure the material is directed into the container. As the force of the discharge is quite strong and the material is often heavy and a mix of sludge and debris, the vacuum hose will vigorously shake and if not controlled will result in the debris material being deposited outside of the container. It is often that a vacuum truck operator may find themselves without the required labor needed to hold a vacuum hose and as such the operation will result in debris spillage.

Accordingly, there is a need for a vacuum truck hose holding apparatus wherein the apparatus of the present invention will be releasably secured to the container in which the debris is to be deposited and is further configured to secure the end of the vacuum hose so as to maintain in a stable position during deposit of debris into the container.

SUMMARY OF THE INVENTION

It is the object of the present invention to provide a vacuum truck hose holding apparatus that is operable to maintain the end of the vacuum hose in a stable position during deposit of debris into a container wherein the present invention includes a frame operable to have a portion of a vacuum hose releasably secured thereto.

Another object of the present invention is to provide a vacuum hose holding apparatus configured to hold a vacuum hose in a steady position during discharge of debris wherein frame of the present invention includes a central cradle member.

A further object of the present invention is to provide a vacuum truck hose holding apparatus that is operable to maintain the end of the vacuum hose in a stable position during deposit of debris into a container wherein the central cradle member has operably secured thereto a first securing member and a second securing member.

Still another object of the present invention is to provide a vacuum hose holding apparatus configured to hold a vacuum hose in a steady position during discharge of debris wherein the present invention further includes a first hose support section wherein the first hose support section extends downward from said central cradle member.

An additional object of the present invention is to provide a vacuum truck hose holding apparatus that is operable to maintain the end of the vacuum hose in a stable position during deposit of debris into a container wherein the frame includes a second hose support section wherein the second hose support section extends outward from said central cradle member.

Yet a further object of the present invention is to provide a vacuum hose holding apparatus configured to hold a vacuum hose in a steady position during discharge of debris wherein the central cradle member has operably coupled thereto a first hose retention member.

Another object of the present invention is to provide a vacuum truck hose holding apparatus that is operable to maintain the end of the vacuum hose in a stable position during deposit of debris into a container wherein the frame of the present invention includes a second hose retention member.

Still another object of the present invention is to provide a vacuum hose holding apparatus configured to hold a vacuum hose in a steady position during discharge of debris wherein the second hose support section includes an arcuate shaped hose engagement member.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
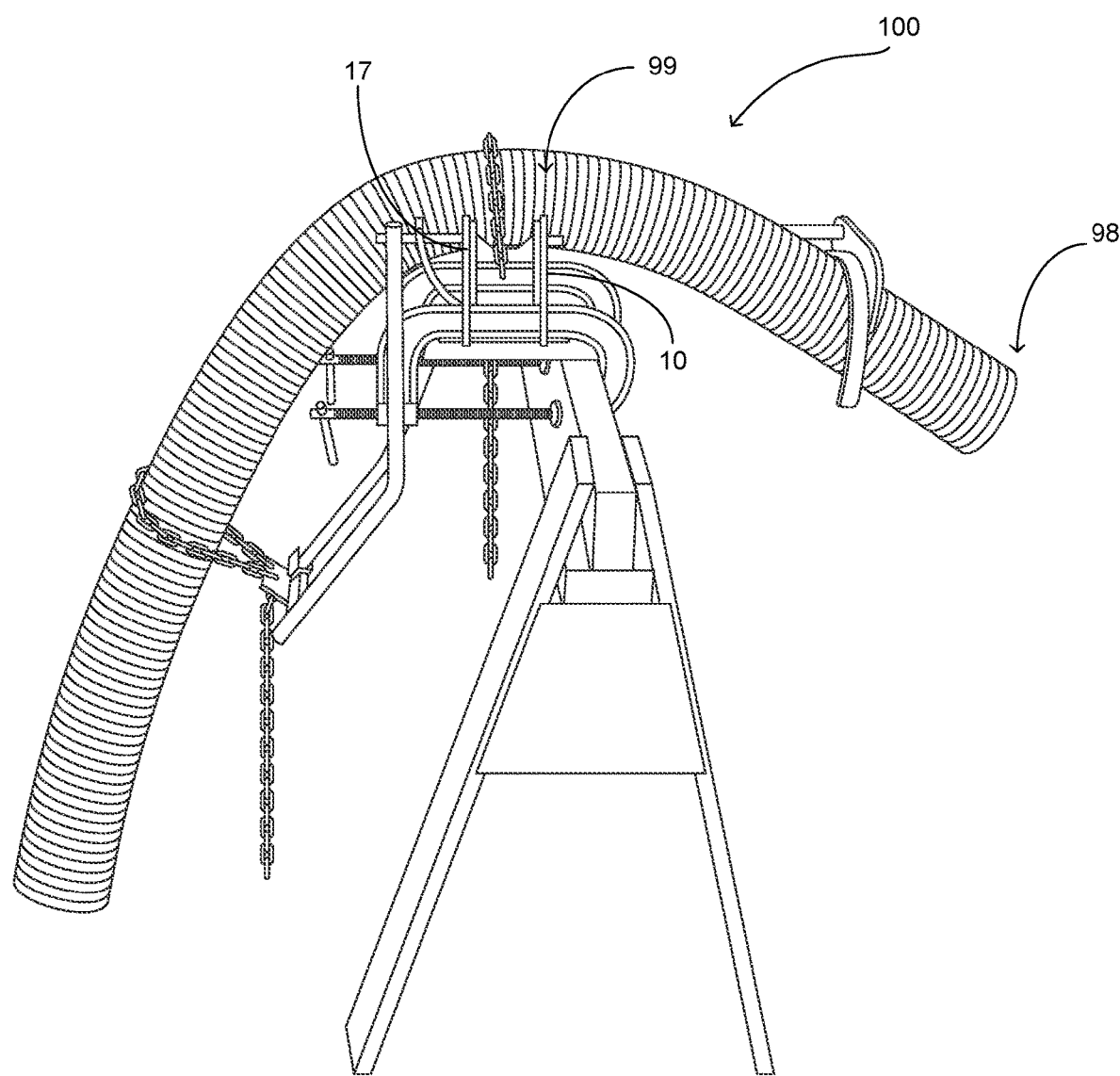
FIG. 1 is a side view of the present invention with a hose operably coupled thereto.

Referring now to the drawings submitted herewith, wherein various elements depicted therein are not necessarily drawn to scale and wherein through the views and figures like elements are referenced with identical reference numerals, there is illustrated a vacuum hose holding apparatus 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Figure 2:
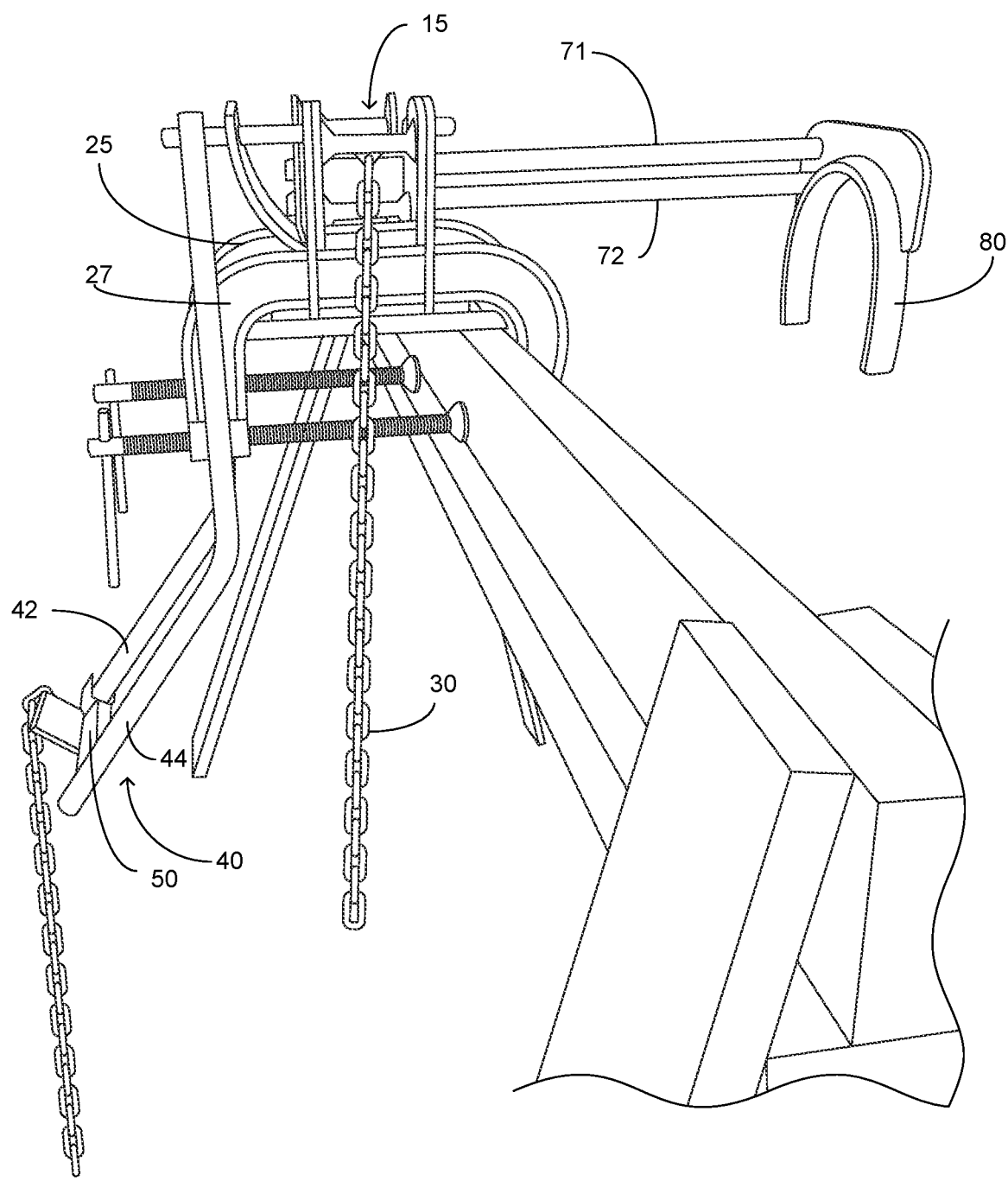
FIG. 2 is a side view of the present invention.
Figure 3:
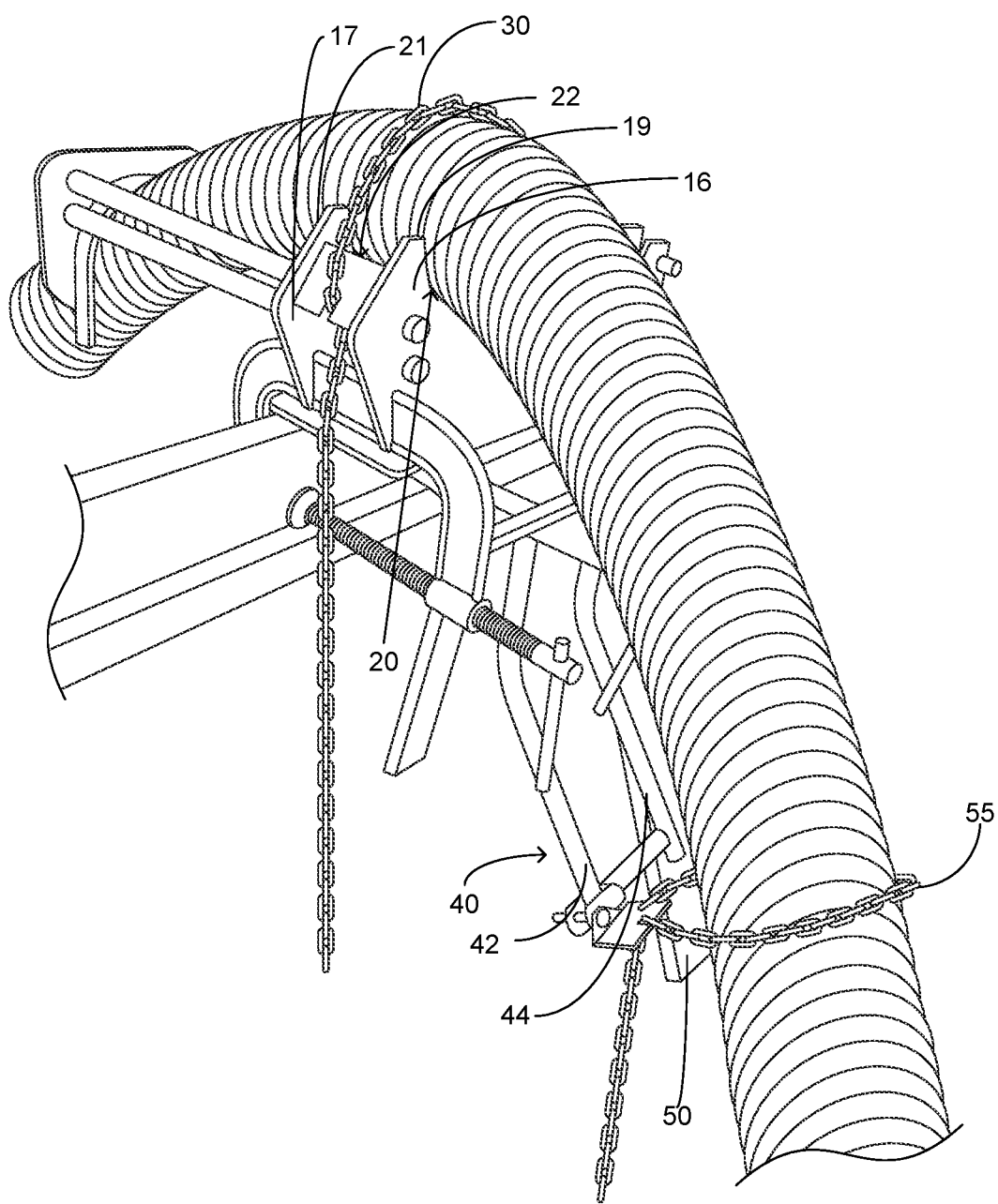
FIG. 3 is a rear perspective view of the present invention with a hose operably secured thereto.
Figure 4:
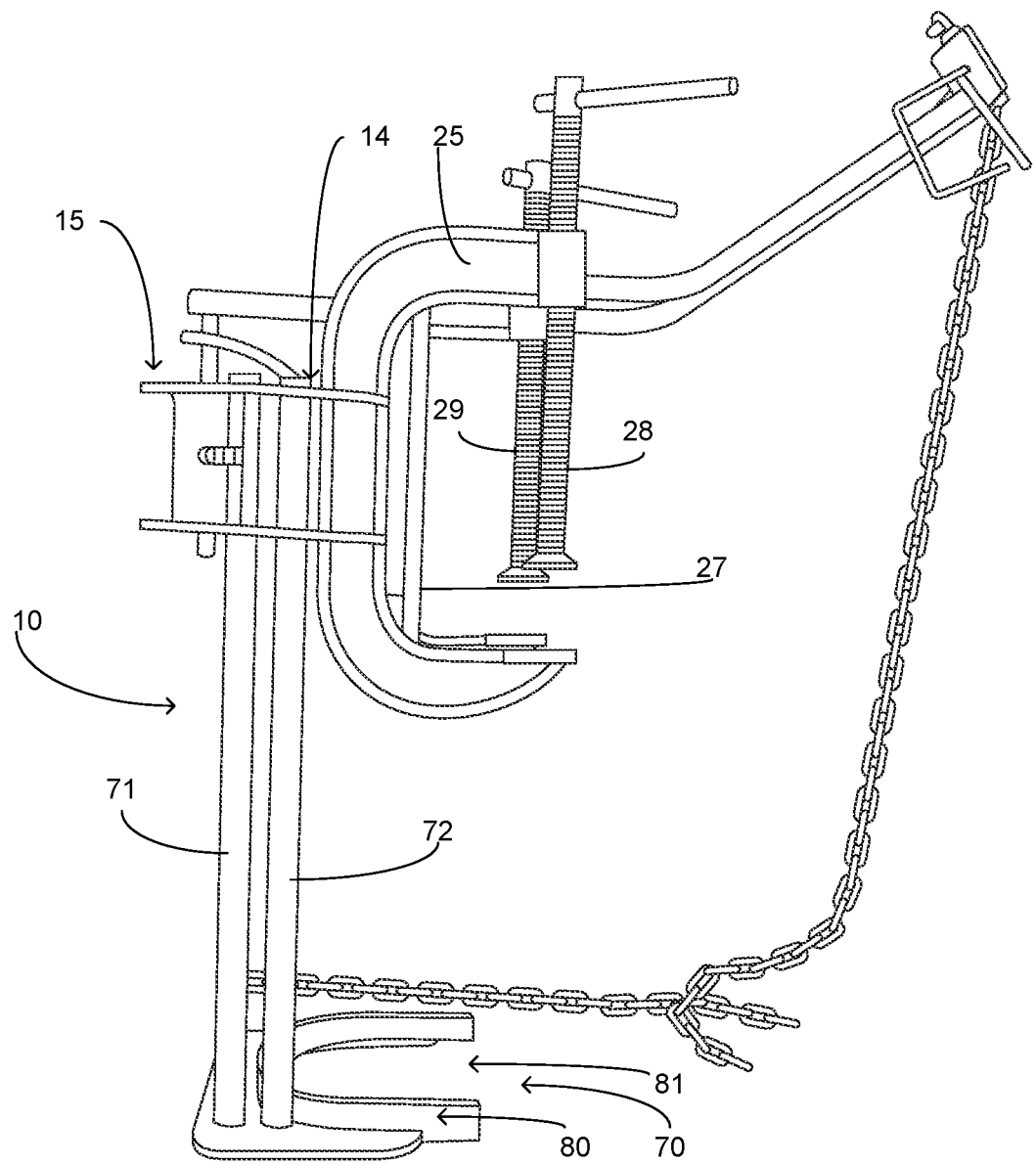
FIG. 4 is a side view of the present invention.

Referring in particular to the Figures submitted as a part hereof, the vacuum hose holding apparatus 100 includes a frame 10 wherein the frame 10 is manufactured from a suitable rigid material such as but not limited to metal. The frame 10 is configured to operably secure to a container(not illustrated herein) so as to position the hose 99 wherein the end 98 of the hose 99 is over an opening of the container so as to facilitate deposit of debris into the container that is egressing from the hose 99. FIGS. 1, 2 and 3 herein illustrate the frame 10 secured to a sawhorse and provide demonstration of how the frame 10 is secured to an upper edge of a container.

The frame 10 includes a central cradle member 15. The central cradle member 15 includes a first plate member 16 and a second plate member 17 that are identical in size and shape. A plurality of cross members 18 are operably coupled intermediate the first plate member 16 and second plate member 17 and are perpendicular thereto. The cross members 18 are secured utilizing suitable techniques such as but not limited to welding. The first plate member 16 includes an upper edge 19 having a notch 20 formed therein. Similarly, the second plate member 17 includes an upper edge 21 wherein the upper edge 21 includes a notch 22 shaped therein. Notches 20,22 are formed in order to mateably receive the hose 99 therein. The radius of the notches 20, 22 is generally equivalent to the circumference of the hose 99 in order to facilitate a proper fit and securing of the hose 99 into the central cradle member 15. It should be understood within the scope of the present invention that the first plate member 16 and second plate member 17 with their respective notches 20, 22 could be manufactured in alternate sizes to accommodate various hoses employed for different applications. Furthermore it should be understood within the scope of the present invention that the central cradle member 15 could be manufactured with alternate elements and still achieve the desired functionality as discussed herein.

The central cradle member 15 includes integrally formed in the lower end 14 thereof a first securing member 25 and a second securing member 27. The first securing member 25 and second securing member 27 are operable to secure the vacuum hose holding apparatus 100 to an edge of a container in which it is desired to deposit debris thereinto that is being discharged from the end 98 of the hose 99. The first securing member 25 and second securing member 27 are generally C-shaped having movable threaded securing rods 28,29 that are operable to clamp the vacuum hose holding apparatus 100 into a desired position along an upper edge of a container. It should be understood within the scope of the present invention that the vacuum hose holding apparatus 100 could be releasably secured to an upper edge of a container utilizing various alternate elements in place of and/or in conjunction with the first securing member 25 and second securing member 27. It is further contemplated within the scope of the present invention that the central cradle member 15 could have only one securing member or more than two securing members that are configured to mount the vacuum hose holding apparatus 100 to an upper edge of a container. The central cradle member 15 includes a first hose retention member 30 operably coupled thereto. The first hose retention member 30 is configured to be placed over the hose 99 so as to releasably secure to the central cradle member 15. While the first hose retention member 30 is illustrated as a chain herein, it is contemplated within the scope of the present invention that the first hose retention member 30 could be manufactured from various alternate materials or be constructed from alternate elements and execute the desired function of releasably securing the hose 99 to the central cradle member 15.

Integrally formed with the central cradle member 15 and extending downward therefrom is the first hose support section 40. The first hose support section 40 includes arm members 42, 44 that are manufactured from tubular steel or other suitable material. The arm members 42, 44 are arranged in a parallel manner having a void 46 therebetween. A lower support plate 50 is secured intermediate the arm member 42, 44 and is perpendicular thereto. The lower support plate 50 is operably coupled intermediate the arm members 42,44 utilizing suitable durable techniques. The lower support plate 50 has operably coupled thereto a second hose retention member 55. The second hose retention member 55 is configured to releasably secure the hose 99 to the first hose support section 40 as is illustrated in FIG. 3. While the second hose retention member 55 is illustrated as being a chain herein, it should be understood within the scope of the present invention that the second hose retention member 55 could be manufactured from alternate materials. Furthermore, while a specific construction of the first hose support section 40 has been discussed and illustrated herein, it is contemplated within the scope of the present invention that the first hose support section 40 could be constructed in alternate manners with various elements and achieve the desired functionality discussed herein.

The vacuum hose holding apparatus 100 further includes a second hose support section 70. The second hose support section 70 is operably coupled to the central cradle member 15 at the upper end thereof and extends outward therefrom. The second hose support section 70 is configured to releasably secure end 98 of the hose 99 so as to ensure the end 98 maintains a desired position over a container in which the hose 99 is depositing debris. The second hose support section 70 will extend over an edge and above an opening of a container ensuing securing of the vacuum hose holding apparatus 100 to a container in which debris will be deposited. The second hose support section includes an upper arm member 71 and a lower arm member 72 that are secured to the central cradle member 15 utilizing suitable techniques. The upper arm member 71 and lower arm member 72 have secured thereto distal to the central cradle member 15 a hose engagement member 80. The hose engagement member 80 is arcuate in shape having an opening 81 proximate the bottom thereof. The hose engagement member 80 is positioned so as to have the end 98 of the hose 99 releasably secured therein with the hose engagement member 80 being superposed the hose 99. This orientation ensures maintenance of engagement of the hose 99 with the hose engagement member 80 during movement most often associated with discharge of debris. The upper arm member 71 and lower arm member 72 are located on the same side of the second hose support section 70 so as to facilitate the loading of the hose 99 into the second hose support section 70. While a particular configuration of the second hose support section 70 has been illustrated and discussed herein, it is contemplated within the scope of the present invention that the second hose support section 70 could be constructed in alternate manners and achieve the desired objective discussed herein.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A vacuum hose holding apparatus that is operable to maintain an end of a vacuum hose adjacent a container wherein the vacuum hose holding apparatus comprises:
   a frame, said frame having a central cradle member, said central cradle member having a portion thereof that is configured to mateably engage the vacuum hose, said central cradle member having a securing member, said securing member formed in a lower end of the central cradle member, said securing member operable to secure the vacuum hose holding apparatus to an upper edge of a container;
   a first hose support section, said first hose support section being operably coupled to said central cradle member, said first hose support section extending downward from said central cradle member;
   a second hose support section, said second hose support section being operably secured to said central cradle member opposite said first hose support section, said second hose support section being secured proximate an upper end of said central cradle member, said second hose support section extending outward from said central cradle member being perpendicular thereto, said second hose support section comprising a hose engagement member, said hose engagement member configured to secured an end of the vacuum hose and said hose engagement member is arcuate in shape having an opening on a lower end thereof; and
   a first hose retention member, said first hose retention member having a first end and a second end, said first hose retention member being secured to said central cradle member, said first hose retention member operable to be superposed a section of the vacuum hose that is engaged with the central cradle member,
   a second hose retention member, said second hose retention member being secured to said first hose support section, said second hose retention member configured to be superposed a portion of the vacuum hose disposed in said first hose support section,
   wherein the vacuum hose is releasably secured in position on the vacuum hose holding apparatus so as to assist in deposit of debris egressing from the vacuum hose into the container, and
   wherein said first hose retention member and said second hose retention member are manufactured from chain.

2. A vacuum hose holding apparatus configured to have a portion of a vacuum hose releasably secured thereto and further be secured to a container proximate an opening thereof wherein the vacuum hose holding apparatus comprises:
   a frame, said frame having a central cradle member, said central cradle member having a lower end and an upper end, said central cradle member having a first plate member and a second plate member, said first plate member and said second plate member being of a same size and shape having a void therebetween, said first plate member and said second plate member having an upper edge surface;
   a first securing member, said first securing member being formed in the lower end of said central cradle member, said first securing member operable to releasably secure the frame to an upper edge of the container;
   a second securing member, said second securing member being formed in the lower end of said central cradle member, said second securing member operable to releasably secure the frame to an upper edge of the container, said second securing member being parallel and adjacent to said first securing member;
   a first hose support section, said first hose support section being operably coupled to said central cradle member, said first hose support section extending downward from said central cradle member, said first hose support section having a first arm member and a second arm member, said first arm member and said second arm member having a void therebetween;
   a second hose support section, said second hose support section being operably secured to said central cradle member opposite said first hose support section, said second hose support section being secured proximate the upper end of said central cradle member, said second hose support section extending outward from said central cradle member being perpendicular thereto, said second hose support section having an upper arm member and a lower arm member, said upper arm member and said lower arm member being parallel and further being perpendicular to said central cradle member, said first arm member and said second arm member being perpendicular to said central cradle member; and wherein the vacuum hose holding apparatus is configured to orient the vacuum hose so as to direct material egressing therefrom into the container.

3. The vacuum hose holding apparatus as recited in claim 2, wherein the second hose support section includes a hose engagement member, said hose engagement member being secured to said upper arm member and said lower arm member, said hose engagement member having an upper end and a lower end, said hose engagement member being arcuate in shape having an opening proximate said lower end.

4. The vacuum hose holding apparatus as recited in claim 3, wherein said first securing member and said second securing member are C-shaped, said first securing member and said second securing member further having a threaded rod member operable to bias against the container in order to releasably secure the vacuum hose holding apparatus thereto.

5. The vacuum hose holding apparatus as recited in claim 4, and further including a first hose retention member, said first hose retention member having a first end and a second end, said first hose retention member being secured to said central cradle member, said first hose retention member operable to be superposed a section of the vacuum hose that is engaged with the central cradle member.

6. The vacuum hose holding apparatus as recited in claim 5, wherein the first hose support section further includes a cross support member proximate an end thereof distal to said central cradle member, said cross support member being secured intermediate the first arm member and second arm member of the first hose support section.

7. The vacuum hose holding apparatus as recited in claim 6, and further including a second hose retention member, said second hose retention member being secured to the cross support member of said first hose support section, said second hose retention member configured to be superposed a portion of the vacuum hose disposed in said first hose support section.

8. The vacuum hose holding apparatus as recited in claim 7, wherein said upper arm member and said lower arm member of the second hose support section are located on a same side of the hose engagement member.

* * * * *